United States Patent Office 3,212,149
Patented Oct. 19, 1965

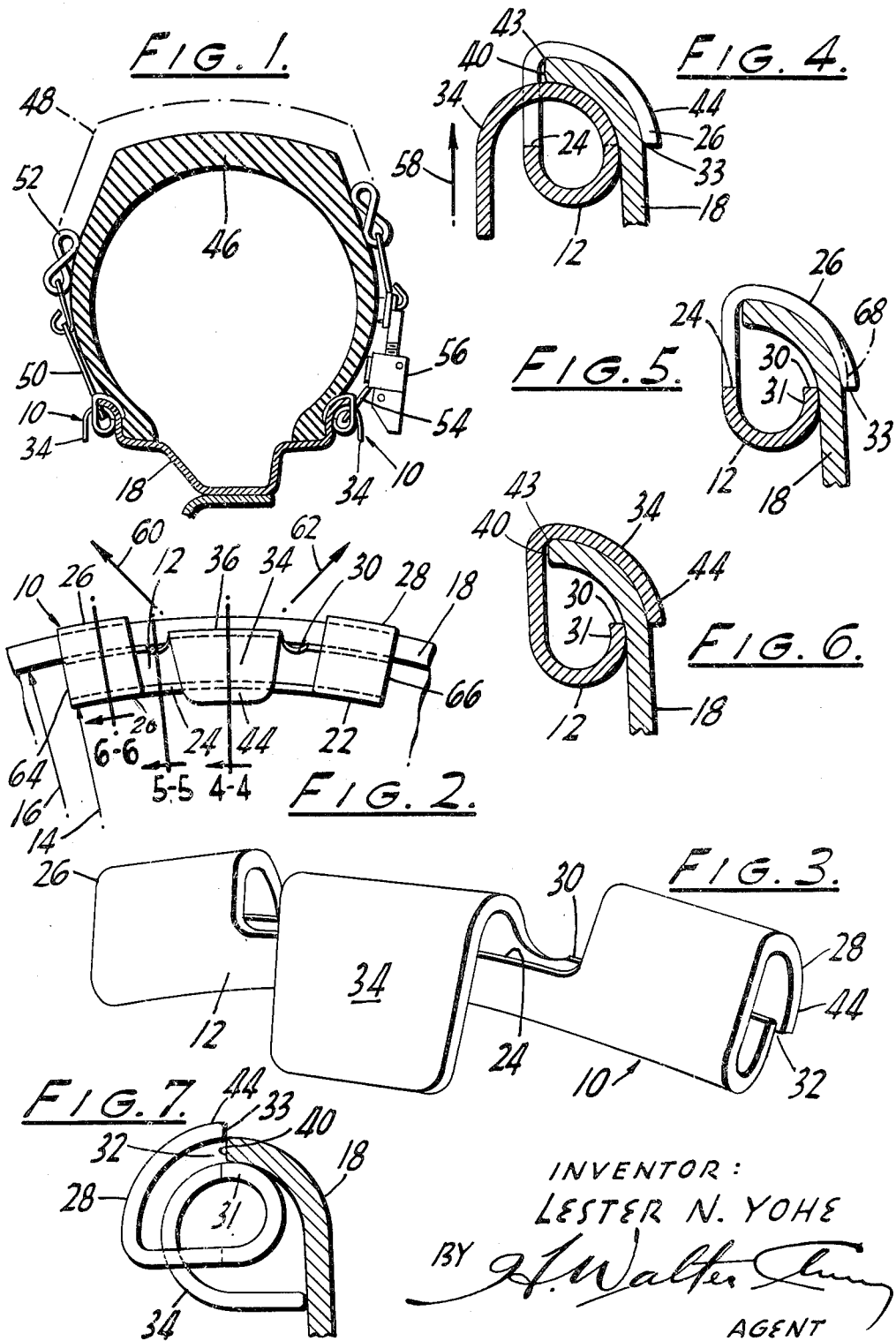

3,212,149
CLIP FOR ATTACHING ANTISKID CROSS-CHAINS TO VEHICLE WHEELS
Lester N. Yohe, 1601 Melrose Ave., Havertown, Pa.
Filed Aug. 20, 1964, Ser. No. 390,816
7 Claims. (Cl. 24—84)

The invention hereinafter described and claimed has to do with clips for removably attaching antiskid traction devices, such as cross-chains, to vehicle wheels.

It is a primary object of the invention to provide an improved clip facilitating the mounting of cross-chains transversely around tires of vehicle wheels under the most unfavorable road conditions without necessitating jacking-up the wheel.

Another object of the invention is to provide such clips which may be pre-installed on vehicle wheels to remain in position for easy and rapid attachment thereto of cross-chains whenever additional traction is needed and without upsetting wheel balance when symmetrically arranged around the wheel.

It is a further object of the invention to provide such clips which are characterized by their economical manufacture, their ruggedness, their ease of mounting, and their ability to retain their original position on a wheel under the most adverse use.

In accordance with the above and first briefly described, the invention comprises a clip formed to receive and grip a wheel flange in a manner securely holding it thereon, and when used in pairs on opposite sides of a wheel, to provide means for securing the ends of cross-chains thereto. The construction and arrangement of the clips is such that when in use, forces exerted by a cross-chain secured thereto will tighten the grip of the clips to the wheel flanges, thus to prevent displacement of the clips from their selected positions on the wheel.

In the drawings:

FIG. 1 is a cross-sectional view of a tire and rim assembly with a cross-chain secured thereto by oppositely positioned clips in accordance with the present invention;

FIG. 2 is an elevational view of a fragmentary portion of the tire and wheel showing a clip attached thereto;

FIG. 3 is a perspective view of a clip embodying the invention;

FIGS. 4, 5 and 6 are sectional views taken along lines 4—4, 5—5 and 6—6 respectively, of FIG. 2; and FIG. 7 is a fragmentary view showing a step in the mounting of a clip to a wheel flange.

Now with reference to the details of the various figures of the drawings and first to FIGS. 2 and 3, it will be seen that the invention is best embodied in a clip 10 having an elongated body member 12, substantially U-shaped in cross-section, when viewed as shown in FIGS. 4–6, and, as seen more clearly in FIG. 2, preferably curved throughout its length on a radius 14 complementary to the radius 16 of the rim flange 18. It should be understood that some degree of tolerance can be accommodated in this radius so that the clips can be mounted on rims of different radii. For example, a clip formed on a radius to fit a 14 inch diameter wheel can also be mounted on wheels of both 13 inch and 15 inch diameters. The clip is formed of spring steel such as SAE 1070, suitable to permit the necessary flexing.

Projecting from opposite ends 20 and 22 of the longitudinal edge 24 of the U-shaped body member are tabs 26 and 28 which, as seen in FIG. 5, extend upwardly and curve over the other longitudinal edge 30, then downwardly in spaced relationship with the leg 31 of the body member such as snugly to receive a portion of a wheel flange 18 there between. The spacing 32 between the terminal ends 33 of the tabs 26 and 28 and leg 31 is slightly less than the thickness of the rim flange, thereby to provide a tight grip of the clip to the flange when fully mounted. The remaining portions of the downwardly extending tab portions preferably approximates the curvature of the flange.

The edge 30 is provided with a tab 34 extending from its central portion 36 and, as seen in FIG. 4, curves upwardly over the edge 24 in spaced relationship therewith, and then downwardly to form hook means for securing an end of a cross-chain thereto, as described below. The upward curvature of the tab 34 preferably is substantially the same as the curvature of the underside of the wheel flange.

In mounting the clip, it is placed against the outer edge 40 of the rim flange 18 registered, as seen in FIG. 7, with the space 32 between the leg 31 of the body member and the outer edge 33 of the spaced tabs 26 and 28, and then is forced fully onto the flange.

As shown in FIGS. 4–6 the wheel flange is gripped on both sides—by the two tabs and the leg 31 of body member 12—with the outer edge 40 of the flange abutting the inner surfaces of the tabs 26 and 28 at 43. The tabs 26 and 28 may be long enough for their outer end portions 44 to be gripped between the tire 46 and the rim, but it should be understood that this is not necessary, for the clip does not rely upon the tire for its retention upon the rim flange.

In use, as seen in FIG. 1, clips are mounted on the wheel flanges on opposite sides of the rim as pairs, each pair providing the means for securing the opposite ends of one cross-chain 48 positioned transversely around the tire. While others can be used, these cross-chains may be like those in applicant's co-pending application Serial No. 349,613 filed Mar. 5, 1964 and entitled Anti-skid Device.

One end loop 50 of the cross-chain is hooked over the tab 34 of the clip on the inner side of the wheel. The chains 52 are then drawn around the tire and the other end loop 54 is hooked over the tab 34 of the clip on the outer side of the wheel with the toggle 56 open. The cross-chain is brought up "tight" and "locked" in place by closing the toggle mechanism 56, all as described in the co-pending application.

It will be understood that according to a particular feature of this invention forces exerted by the cross-chain on tabs 34 when in use will have the effect of tightening the grip of the clips to the rim flanges. Forces exerted in the direction of the arrow 58 (FIG. 4) will urge the clip in a counter-clockwise direction causing the flange edge 40 to be urged more tightly against the inner surfaces of tabs 26 and 28 at 43, while the force itself is counteracted and substantially absorbed by the flange through contact therewith of the tab 34 with the underside of the flange. Forces exerted in the directions of the arrows 60 and 62 (FIG. 2) will cause the outer edges 64 and 66 of the clip to grip the flange more tightly, thus preventing the clip from being inadvertently removed from the flange, or from creeping around the flange in a circumferential direction. If desired the outer end portions 44 of tabs 26 and 28 may be tapered as indicated at 68 in FIG. 5.

What is claimed:

1. A clip for securement on opposite rim flanges of a vehicle wheel as pairs for attachment thereto of a cross-chain traction device arranged transversely around a tire mounted on the rim, comprising:

(a) an elongated body member, U-shaped in cross-section, and curved throughout it's length on a radius approximating that of said rim flanges;

(b) separated tabs extending upwardly from the upper longitudinal edge of one leg of the U-shaped body member, and then turned downwardly to terminate in spaced relationship with the other leg of said body member thus to cooperate therewith tightly to receive the wheel flange therebetween, and (c) hook means for attaching an end of said cross-chain to said clip;

(d) said hook means comprising a tab extending upwardly from the upper longitudinal edge of the other leg of said U-shaped body member then turned downwardly between the said separated tabs to terminate in spaced relationship with the said one leg of said U-shaped body member.

2. A clip according to claim 1 for securement to outwardly curving wheel rim flanges, wherein:

(a) the downward extension of said spaced tabs is curved substantially on the same radius as the curvature of the inner surface of said rim flanges.

3. A clip according to claim 2 wherein:

(a) said spaced tabs extend from the opposite ends of said upper longitudinal edge of said one leg; and (b) said hook forming tab is intermediate said separated tabs.

4. A clip according to claim 1 wherein:

(a) the upward extension of the said hook forming tab has substantially the same curvature as the outer surface of the said rim flange and is in contact therewith when mounted on said flange.

5. A clip accordance with claim 1 wherein:

(a) the upward extension of said spaced tabs when the clip is mounted on a rim flange is such as to engage the outer edge of said rim flange to position the clip on said flange.

6. A clip according to claim 1 wherein:

(a) the opposite ends of said clip are arranged to cooperate with the body member to clamp the surface of said rim flange in response to forces tending to displace said clip circumferentially.

7. A clip for securement on opposite outwardly curved rim flanges of a vehicle wheel as pairs for attachment thereto of the ends of a cross-chain traction device arranged transversely around a tire mounted on the rim, comprising:

(a) an elongated body member, U-shaped in cross-section, and curved throughout its length on a radius approximating that of said rim flange;

(b) separated tabs extending upwardly from the ends of the upper longitudinal edge of one leg of the U-shaped body member, and then turned downwardly to terminate in spaced relationship with the other leg of said body member, thus to cooperate therewith tightly to receive the wheel flange therebetween, the said downwardly turned portion having substantially the same curvature as the curvature of the inner surface of said flange, and said upwardly extending portion being arranged for contact with the outer edge of said flange when the clip is mounted thereon; and (c) hook means for attaching an end of said cross-chain to said clip;

(d) said hook means comprising a tab extending upwardly from the middle of the upper longitudinal edge of the other leg of said U-shaped body member, then turned downwardly between the said separated tabs to terminate in spaced relationship with the said one leg of said body member, the said upward extension being curved at substantially the same curvature as the outer surface of said flange and in contact therewith when mounted on the flange.

References Cited by the Examiner

UNITED STATES PATENTS 2,469,997   5/49   Simpson _____ 301—5

ARTHUR L. LA POINT, *Primary Examiner.*